June 26, 1956
R. B. MATTHEWS
2,751,975
CONTROL APPARATUS
Filed May 5, 1953
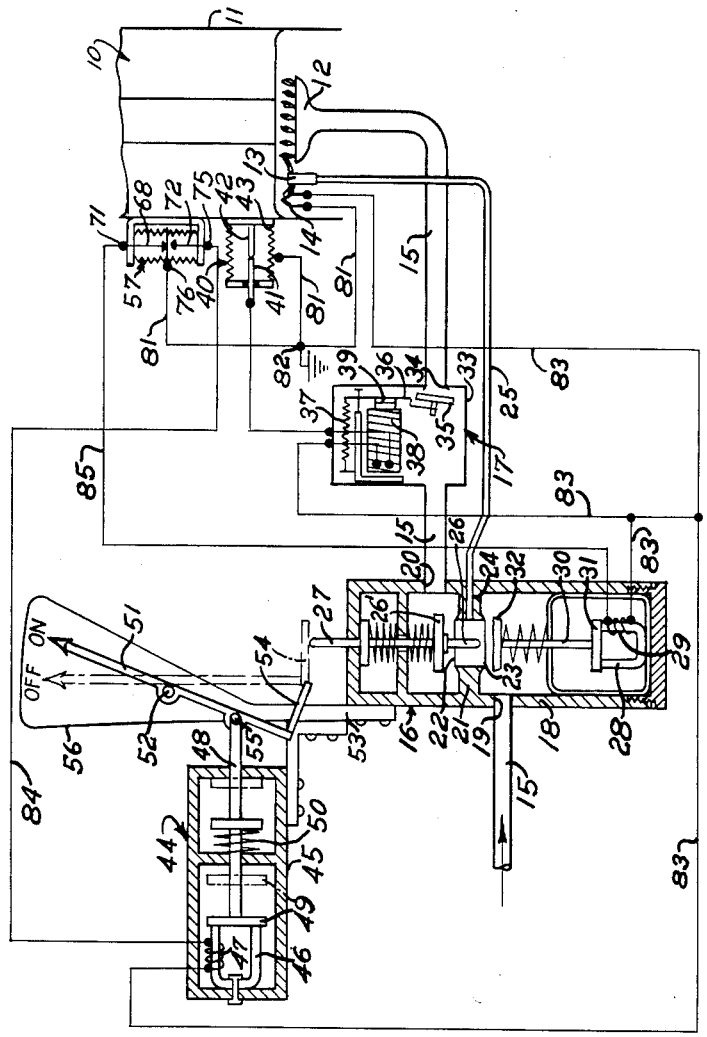
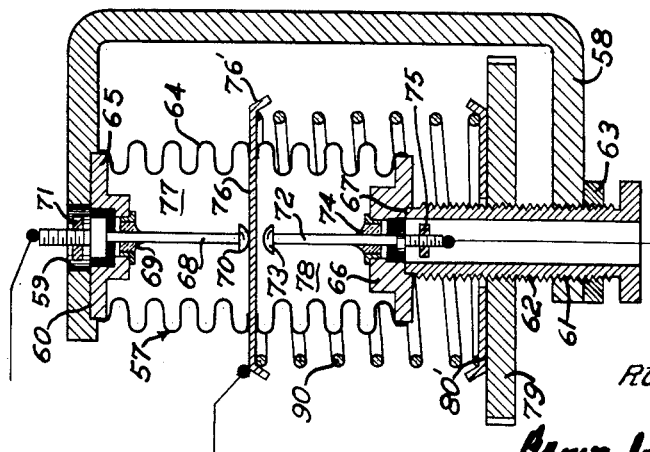
INVENTOR.
RUSSELL B. MATTHEWS
BY
*Burns, Jackson, Bottelle & Dienner*
ATTYS.

United States Patent Office

2,751,975
Patented June 26, 1956

2,751,975

CONTROL APPARATUS

Russell B. Matthews, Wauwatosa, Wis., assignor to Milwaukee Gas Specialty Company, Milwaukee, Wis., a corporation of Wisconsin Application May 5, 1953, Serial No. 353,107

17 Claims. (Cl. 158—122)

This invention relates to improvements in condition responsive circuit controlling devices and fuel control apparatus for fluid fuel burners including such devices.

More particularly the invention relates to temperature responsive circuit controlling devices of the single-pole-double-throw type for controlling a plurality of electrical circuits, at least one of which is of low power, such as, for example, a circuit energized by a thermoelectric generator or a single thermocouple. Such a device may, for example, be included in control apparatus for fluid fuel burners in circuit with a thermoelectrically powered safety shut-off device to open the circuit thereto upon occurrence of a predetermined temperature for shut down of the apparatus, and to simultaneously close the circuit to actuate indicating means which may be located remotely from the fuel burning apparatus.

The provision of means indicating that the shut down of the fuel burning equipment, for example, a water heater, was the result of excessive temperatures saves much service time, since the serviceman can tell at a glance whether or not shut-down was the result of excessive temperatures or some other malfunctioning of the apparatus. If the indicator has not been actuated, the serviceman knows that shut-down resulted from pilot failure or some cause other than high temperature, and he can then correct the cause of said failure without delay.

In certain fuel burning equipment it is desirable, from manufacturing, service or other considerations, to have a high limit drop-out indicator located remotely from the high limit circuit controlling device, rather than at said device.

With this in mind, it is an object of the present invention to provide a fuel control apparatus of the general type hereinafter referred to having drop-out indicating means under the control of, and which may be remote from, the circuit controlling device which controls the operation of the safety shut-off valve.

Another object of the invention is to provide an improved fuel control apparatus of the character described wherein the safety shut-off valve and the drop-out indicating means are electromagnetically operated, said valve and indicating means being connected in circuit with a single-pole-double-throw circuit controlling device of novel construction and with a source of thermoelectric current, said circuit controlling device normally permitting current flow from said source to said safety shut-off valve to energize and hold the latter open, said circuit controlling device being responsive to a predetermined temperature, for example a high limit temperature, to interrupt the flow of current to the shut-off valve and close the latter, and to alternatively permit current flow from said source to said indicating means for actuation of the latter.

A more specific object of the invention is to provide an improved circuit controlling device which is temperature responsive, but which is substantially immune to circumambient pressures, thereby providing uniform operational characteristics at any altitude or under any variation in ambient pressure.

Another specific object of the invention is to provide an improved single-pole-double-throw circuit controlling device which may be utilized to simultaneously control two circuits, at least one of which is of low power, for example, a thermoelectric circuit.

Another object of the invention is to provide an improved fuel control apparatus of the character described wherein the operator of the drop-out indicating means includes a permanent magnet and an armature which is biased away from, but movable to an attracted position in engagement with said magnet, the attractive force of said magnet holding said armature in said attracted position when moved thereto, there being a depolarizing coil positioned in coacting relationship with said magnet, and when thermoelectric current is made to flow through said coil in one direction, a magnetic field is established which opposes the field of the magnet and substantially reduces the attractive force of the latter to less than the biasing force on the armature, whereupon the armature is moved away from said attracted position to a drop-out position.

Another object of the invention is to provide an improved circuit controlling device which includes three contacts in single-pole-double-throw relationship, all of which are encapsulated in a hermetically sealed enclosure.

Another object of the invention is to provide an improved fuel control apparatus of the character described in which the safety shut-off valve and the electromagnetic drop-out indicating mechanism are manually resettable, the apparatus being so arranged that neither said valve nor said mechanism can be successfully reset while the circuit controlling device is subjected to excessive temperatures.

Another object of the invention is to provide an improved apparatus of the class described wherein the indicating member of said indicating mechanism serves also as a resetting member, the safety shut-off valve being provided with a reset button, and the indicating mechanism being so positioned that when the indicating and reset member is in drop-out indicating position, it prevents manual actuation of the reset button of the safety shut-off valve.

Another specific object of the invention is to provide an improved circuit controlling device comprising a hermetically sealed bellows having a pair of fixed opposite end walls each carrying a fixed contact member within said bellows, there being an intermediate transverse wall between said contacts separating said bellows into two separate sealed chambers, said intermediate wall having a portion serving as an electrical contact member normally in circuit-making relationship with one of said contacts, there being a temperature responsive expansible and contractible volatile fluid fill in one of the chambers, and said fill being responsive to a predetermined temperature, for example a high limit temperature, to move said intermediate wall portion away from said latter fixed contact and into circuit-making relationship with the other contact.

Another specific object of the invention is to provide an improved circuit controlling device of the class described wherein the second chamber within the bellows may contain a gaseous fill which is stable under arcing conditions and therefore permits the control of higher voltages by the coacting of the fixed contact therein with the movable intermediate wall.

Another object of the invention is to provide an improved fuel control apparatus which, by the reversal of the fills in the chambers of the single-pole-double-throw circuit controlling device, has utility as a low limit temperature responsive safety shut-off and indicating means having utility, for example, for control of fluid fuel burning refrigeration equipment.

Other and further objects and advantages will appear from the following detailed description taken in connection with the accompanying drawing illustrating the invention as applied to a fuel burning water heater. It is to be understood, however, that the invention, and particularly the improved single-pole-double-throw circuit controlling device, is not limited to use in connection with water heaters.

In the drawing:

Figure 1 is a semi-diagrammatic view illustrating the application of the improved fuel control apparatus to a water heater; and Figure 2 is an enlarged axial sectional view of the improved single-pole-double-throw circuit controlling device which is embodied in the improved fuel control apparatus.

Referring now to Figure 1 of the drawing, the embodiment of the invention selected for illustration is applied to a water heater 10 having a tank 11 and a main burner 12 below said tank. A pilot burner 13 is mounted adjacent the main burner 12, and a thermoelectric generator 14, which may take the form of a thermocouple, is mounted adjacent the pilot burner in a position so that the "hot junction" of the thermocouple is subjected to the heat of the pilot burner flame in a manner well known in the art. The aforementioned thermocouple, as will be understood, affords a source of electrical energy of low power (a thermocouple presently being manufactured by the assignee of this invention being capable of producing about 20 to 30 millivolts) for energization of control means hereinafter described.

A main fuel supply line 15 is adapted to supply fuel from a suitable source (not shown) to the main burner 12. A manually resettable electromagnetically operated safety shutoff fuel control valve 16 is interposed in the main fuel line 15, and a cycling type electromagnetically operated fuel control valve 17 is interposed in the line 15 between the valve 16 and the main burner 12, as shown.

The safety shut-off valve 16 may be of the type shown and described in Henry F. Alfery Patent Number 2,296,322, issued on September 22, 1942. Suffice it to state for the purposes of this application that the valve 16 has a tubular body 18 provided with a fuel inlet 19 and a fuel outlet 20. A centrally apertured transverse partition 21, between the inlet 19 and outlet 20, is provided with a pair of spaced annular valve seats 22 and 23. A passage 24 affords communication between a pilot burner fuel supply pipe 25 and the central aperture of the partition 21. An outwardly spring urged reset pin 26 is axially slidably mounted in a suitable aperture in an end wall of the body 18 and has an external manually engageable button 27. A spring urged flow interrupter disc 26' is slidably carried by the stem 26 within the valve body 18 and is adapted to sealingly engage the valve seat 22 upon depression of the button 27 and stem 26. An electromagnet 28 having a coil 29 is fixed in the end of the body 18 opposite the button 27. A stem 30 is axially slidably mounted within the body 18 and has an armature 31 connected to one end thereof, there being a valve member 32 connected to the other end of said stem. The valve 32, stem 30 and armature 31 are spring urged in the direction toward the valve seat 23, with which the valve member 32 is cooperable, reciprocation of the stem 30 causing alternate engagement of the armature 31 with the magnet 28 and sealing engagement of the valve member 32 on the annular valve seat 23. As long as thermoelectric current flows through the coil 29 in sufficient quantity, the electromagnet 28 is capable of holding the armature 31 thereagainst when said armature is moved to said position by depression of the reset button 27. Deenergization of the coil 29 releases the armature 31, stem 30, and valve member 32 for movement toward valve closing position.

The cycling fuel control valve 17 is preferably of the type shown in the copending application for patent of Gerald E. Dietz and Adolph J. Hilgert, Serial Number 292,488, filed June 9, 1952, and assigned to the assignee of the instant invention. The valve 17 can be operated on thermoelectric power exclusively, being normally closed and movable to open position in response to flow therethrough of a predetermined thermoelectric current.

The structure of the valve 17 will not be described in detail herein, reference being had to the application Serial No. 292,488 for this purpose. Suffice it to state for the purposes of this application that the valve 17 has a casing 33 provided with a fluid inlet connection and a fluid outlet connection, there being an annular valve seat 34 at the outlet connection. A valve member 35 normally sealingly engages the valve seat 34 to prevent the flow of fuel to the burner 12, said valve member being movable to a retracted open position. The valve member 35 is carried by a pivotally mounted arm 36 which is urged by a spring 37 in a direction to move the valve member 35 toward the seat 34. The arm 36 and spring 37 form a part of an electromagnetic valve operator which also includes an armature 39 having a resilient connection with the arm 36, said connection providing an energy storing means, the structure and operation of which is fully described in the referred to copending application, Serial No. 292,488.

A condition responsive device 40 which may take the form of a thermostatic circuit controlling device is mounted on the wall of tank 11 in a position to sense the temperature thereof. The thermostatic device 40 is preferably of the type shown and described in the copending application for patent of Adolph J. Hilgert, Serial No. 291,047, filed May 31, 1952, and assigned to the assignee of the instant invention. This type of thermostat has extremely high sensitivity and very low differential, and it is well adapted for the control of thermoelectric circuits by reason of its low contact resistance.

Suffice it to state for the purposes of this application, that the thermostat 40 has a pair of coacting contacts 41 and 42 which are fixed to opposite end walls of a hermetically sealed expansible and contractible bellows 43. The bellows 43 preferably contains a volatile fluid fill which expands and contracts in response to temperature changes and causes corresponding expansion and contraction of the bellows with consequent contact movement. For water heater applications normal propyl alcohol has worked out satisfactorily as a fill for the bellows 43. The copending applications of Adolph J. Hilgert, Serial No. 265,445, filed January 8, 1952, and Serial No. 291,047, filed May 31, 1952; and the application of John A. Wolff, Serial No. 266,626, filed January 16, 1952 each of which is assigned to the assignee of the instant invention, list other volatile fluid fills which may be used in encapsulated contact thermostats. Illustrative of the fills mentioned in the foregoing applications are butane, iso-butane, propane, isopentane, isopropyl alcohol, isobutyl alcohol, M-xylene, and P-cymene. The particular fill used in the bellows 43 is dependent upon the particular application of the improved fuel control apparatus. The thermostat 40 also preferably has adjustable spring means (not shown) for varying the temperature control point thereof.

An electromagnetic device 44, which may serve as a drop-out indicating means, may be mounted adjacent the safety shut-off valve 16, as shown. The illustrated form of the device 44 has a tubular body 45 in one end of which a permanent magnet 46 is fixed. A depolarizing coil 47 is wound on the magnet 46, and a stem 48 is axially slidably mounted within the body 45, projecting from the end thereof opposite the magnet 46. An armature 49 is connected to the inner end of the stem 48 and is movable between the attracted position shown (in which position it may contact the pole faces of the magnet) and a released position shown in dot-and-dash lines. The stem 48 and armature 49 are urged toward the released position by a spring 50.

An indicating lever 51 may be pivotally mounted at 52 on a bracket 53 which may be connected to the safety shut-off valve body 18 as shown. The lever 51 preferably has a laterally projecting end portion 54, and the outer end of the stem 48 is pivotally connected to said lever, as at 55. The bracket 53 is preferably provided with a panel 56 bearing indicia cooperating with the upper end of the lever 51 to indicate "off" or "on" corresponding to the released and attracted position respectively of the armature. The bracket 53, lever 51 and electromagnetic mechanism 44 are so mounted that when the armature 49, stem 48 and lever 51 are in the "on" position shown, the portion 54 of the lever 51 is offset laterally from the reset button 27 of the shut-off valve 16. The lever 51 serves as a manually engageable reset member by which the armature 49, stem 48 and said lever can be moved to "on" position. Upon movement of the armature 49 to attracted position, the attractive force of the permanent magnet 46 normally holds said armature, stem 48 and lever 51 in "on" position against the bias of the spring 50. When the armature is released from the magnet, in the manner to be hereinafter more fully described, the spring 50 moves said armature, stem and lever to the "off" or drop-out-indicating position shown in dot-and-dash lines. When the lever 51 is in "off" position, the portion 54 thereof is positioned over the reset button 27 as shown, preventing manual access to said button and hence resetting of the safety shut-off device 16.

A temperature responsive single-pole-double-throw circuit controlling device 57 may be mounted on the outer surface of the tank 11 to sense the temperature thereof. Referring to Figure 2, the device 57 may have a generally U-shaped frame 58 by which said device is mounted on the tank 11 in heat exchanging relationship therewith. One arm of the frame 58 is apertured, as at 59, and is formed with a circular recess 60 in its inner surface. The other arm is provided with an aperture 61 coaxial with the aperture 59 to threadedly receive an externally threaded sleeve 62 which may be provided with a lock nut 63 threaded thereon. A hermetically sealed bellows 64 has a circular end wall 65 seated in the recess 60 and has an opposite end wall 66 externally recessed at 67 to rotatably receive the unthreaded end portion of the sleeve 62 as shown.

The end wall 65 is centrally apertured, and a contact stem 68 extends therethrough in insulatably fixed relationship, there being a glass seal 69 surrounding said stem within said aperture. The inner end of said stem is provided with a rounded contact tip 70, and the outer end is provided with means, such as the nut 71, for affecting a low resistance electrical connection therewith. The opposite bellows end wall 66 is also centrally apertured, and a contact stem 72 extends therethrough in insulatably fixed relationship, said stem having a rounded contact tip 73 on its inner end spaced from the contact tip 70. A glass seal 74 surrounds the stem 72 within the central aperture of the end wall 66, and the outer end of said stem is provided with means, such as a nut 75, for affecting a low resistance electrical connection therewith.

A transverse intermediate wall 76, preferably of metal, is interposed between the contact tips 70 and 73, and separates the bellows 64 into two sealed chambers 77 and 78. The wall 76 projects beyond the periphery of the bellows as shown and has an annular peripheral lip 76'. A coiled compression spring 90 surrounds the portion of the bellows below the wall 76 (as viewed in Figure 2), one end of said spring engaging said wall within the lip 76'. A spring retaining washer 80, having an annular peripheral lip 80', surrounds the sleeve 62 and receives the other end of the spring 90, there being a manual adjustment nut 79 threaded on said sleeve below the retainer 80, as shown.

The spacing between the contacts 70 and 73 can be precisely set by adjustment of the position of the sleeve 62 in the frame 58. It will be noted that the compression spring 90, acting through the wall 76, exerts a compressive force on that portion of the bellows 64 forming the chamber 77. The amount of compressive force exerted by the spring 90 on the chamber 77 can be adjusted by rotation of the nut 79. In the form of the invention selected for illustration, the chamber 77 preferably contains a volatile fluid fill which expands and contracts in response to temperature changes and causes corresponding expansion or contraction of said chamber 77.

The fill used in the chamber 77 may be the same as that used in the bellows 43, and as previously mentioned, normal propyl alcohol has worked out satisfactorily for this purpose when the improved fuel control apparatus is used in connection with a water heater. The particular fill selected for use in the chamber 77 is dependent upon the particular application of the improved fuel control apparatus. The fills mentioned in the previously referred to copending applications of Adolph J. Hilgert, Serial No. 265,455 and 291,047, and of John A. Wolff, Serial No. 266,626, may also be used in the chamber 77, depending upon the particular application of the improved fuel control apparatus. Other, suitable fills may also be used in the chamber 77, those mentioned being merely illustrative.

In the illustrated form of the invention, the chamber 78 preferably contains a stable and/or inert gaseous fill, such as nitrogen or hydrogen. At normal operating temperatures the wall 76 of the illustrated device 57 is in circuit-making relationship with the contact tip 70 and is in circuit-interrupting relationship with the contact 73. The fill within the chamber 77 is responsive to a predetermined temperature, such as the high limit temperature desired for a water heater, to expand the chamber 77 against the force of spring 90 and move the wall 76 in a direction away from the contact 70 and toward the contact 73. The wall 76 is thereby moved to circuit-interrupting relationship with respect to the contact 70 and circuit-making relationship with respect to the contact 73.

Referring now to Figure 1, one conductor 81 of the lead of the thermoelectric generator 14 is connected to the intermediate wall 76 of the circuit controlling device 57 and is also connected to the contact 42 of the circuit controlling device 40, the latter connection being through the bellows 43, since the contact 42 is in circuit with said bellows in the form of the device 40 shown. The conductor 81 may also be grounded as at 82. The other conductor 83 of the thermoelectric generator lead is connected to one side of the coil 29 of the shut-off valve 16, to one terminal of the electromagnetic operator of the cycling valve 17, and to one end of the coil 47 of the electromagnetic device 44. A conductor 84 connects the other end of the coil 47 to the contact stem 72 at 75, and a conductor 85 connects the other end of the coil 29 to the contact stem 68 at 71 as shown. A conductor 86 connects the other terminal of the electromagnetic operator of the valve 17 with the contact 41 of the device 40.

During normal operation of a water heater equipped with the improved fuel control apparatus, the valve 16 is open, and thermoelectric current flowing from the generator 14 through the coil 29 (via the conductors 83 and 85, contacts 68 and 76 and conductor 81) holds said valve open. The armature 49, stem 48 and lever 51 of the device 44 are normally in the "on" position shown, and the attractive force of the magnet 46 holds said parts in this position against the bias of the spring 50, there being no substantial current flow through the coil 47. Thermoelectric current from the generator 14 flows through electromagnetic operator of the valve 17 under the control of the thermostat 40, so that the valve 17 is cycled, i. e., opened and closed, in accordance with normal fluctuations in the temperature of the water in the tank 11.

The thermostats 57 and 40 may function as variable resistance devices wherein a decrease in contact pressure increases the contact resistance, and when the contact resistance reaches a predetermined point where thermoelectric current can no longer flow between said contacts in sufficient quantity to maintain the electromagnetic valve operator in circuit therewith energized, said operator closes the valve. A subsequent increase in contact pressure decreases the contact resistance, and when this resistance decreases to a predetermined point, the thermoelectric current can again flow therethrough in sufficient quantity to energize the valve operator. In the case of a cycling valve, such as the valve 17, energization of the operator is sufficient to open said valve. Manually resettable valves, such as the valve 16, must be manually opened, however.

A highly sensitive automatic control of the thermoelectric current flowing to the operator of the valve 17 can be affected in response to changes in temperature by merely varying the contact pressure of the contact 41 against the contact 42 of the thermostat 40. The electromagnetic operator of the valve 17 inherently has a differential between its pick-up and drop-out current values, and this differential is dependent solely on the electrical constants of the apparatus, that is, the pick-up and drop-out current values of the valve operator in relation to the contact pressure and hence electrical resistance between the contacts 41 and 42 in circuit therewith. The temperature differential required to produce pick-up or drop-out resistance at the contacts is on the order of a few tenths of a degree. This is much smaller than the differential of conventional thermostats, and is so small that in spite of the normal thermal lag inherent in a surface type thermostat, the sensitivity of the thermostat 40 is greater than that of conventional immersion type thermostats. It is apparent, therefore, that the thermostat 40 serves as a very sensitive temperature responsive means which cycles the valve 17 in response to predetermined relatively low temperature differentials.

The copending application for patent of Adolph J. Hilgert and Russell B. Matthews, Serial No. 289,242, filed May 22, 1952, and assigned to the assignee of the instant invention, shows and describes a thermoelectric control circuit incorporating an encapsulated contact thermostat and an electromagnetically operated valve similar in structure and operation to the thermostat 40 and the valve 17. Reference is hereby made to this copending application for additional specific structural details.

If, during operation of the water heater 10, the temperature of the tank 11 reaches that which is the upper limit setting of the thermostat 57, the fill in the chamber 77 (Figure 2) expands sufficiently to move the wall 76 toward the contact tip 73 to circuit-interrupting relationship with respect to the contact 70 and into circuit-making relationship with the contact 73. The flow of thermoelectric current to the coil 29 of valve 16 is thus interrupted, or at least reduced to the point where said valve is deenergized and closes, shutting off all main burner and pilot burner fuel. Since the valve 16 is the manually resettable type, it remains closed until subsequently manually opened by depression of the reset button 27.

Thermoelectric current flowing through the newly made circuit between contacts 72 and 76 flows through the coil 47 via the conductors 81, 84 and 83, the direction of said flow being such that the field established by the current flow through said coil opposes the field of the magnet 46, thereby reducing the attractive force of said magnet on the armature 49 to the point where the force of the spring 50 moves the armature 49, stem 48 and lever 51 to the drop-out indicating or "off" position shown in dot-and-dash lines. The attractive force of the magnet 46 on the dropped-out armature 49 is insufficient to return said armature to attracted position against the bias of the spring 50, even after the thermocouple has cooled and there is no longer a flow of thermoelectric current through the coil 47. When the lever 51 is in "off" or drop-out-indicating position, it not only indicates that shut down of the water heater resulted from excessive temperatures, but the portion 54 of said lever prevents resetting of the valve 16 until said lever is moved to "on" position. It will also be apparent that in the improved control apparatus the valve 16 cannot be successfully reset as long as an excessive temperature condition exists in the tank 11.

Since the connection between the electromagnetic drop-out-indicating mechanism 44 and the circuit controlling device 57 is electrical only, said indicating mechanism can be located remote from said controlling device at a selected position of convenience. It is apparent that the indicating mechanism may also be remote from the valve 16, where no coaction with the reset button of said valve is desired.

While the improved fuel control apparatus has been illustrated in connection with a water heater, it nevertheless can be used advantageously to control other fuel burning equipment. For example, by reversing the fills in the chambers 77 and 78, the improved fuel control apparatus is readily adaptable for the control of fuel in fuel burning refrigeration equipment. In the latter application the improved apparatus is adapted to provide low-limit temperature safety shut-off of the fuel as well as drop-out-indication. In such an arrangement the temperature responsive fill in the chamber 78 contracts in response to a predetermined low-limit temperature to affect movement of the wall 76 from its normal position toward the contact tip 73, thereby affecting shut-off of the fuel and actuation of the lever 51 to "off" position in the manner described hereinbefore.

The improved circuit controlling device 57, while being temperature responsive, is nevertheless immune to circumambient pressures. This is because of the fact that the chambers 77 and 78 are substantially equally responsive to circumambient pressure conditions, and the expansion or contraction of one chamber in response to pressure changes is opposed by like expansion or contraction of the other chamber, so that the forces exerted on the intermediate wall 76 by the two chambers cancel each other. This is not true of the response of the fills to temperature changes, however. The gaseous inert fill does not substantially expand or contract within the range of temperatures in which the device 57 is used, whereas the temperature responsive volatile fluid fill responds to temperature changes with substantial expansion and contraction to cause movement of the wall 76 as described hereinbefore. The immunity of the device to circumambient pressures makes it usable at any altitude without any requirement for pressure compensating adjustment.

While the improved circuit controlling device 57 is shown as used in an exclusively thermoelectric circuit in the illustrated form of the improved fuel control apparatus, its use is not limited to exclusively thermoelectric circuits. The fill used in the chamber 78 is preferably stable under arcing conditions, and therefore the circuit between the wall 76 and the contact 73 may be a higher voltage circuit, for example a 24 volt circuit. Numerous other applications of the improved circuit controlling device 57 will suggest themselves to those skilled in the art.

The form of the invention selected for illustration is for the purpose of disclosure only, and is not intended to impose any limitations on the claims or to confine the invention to a particular use. Various changes and modifications may be made without departing from the spirit of the invention, and all of such changes are contemplated as may come within the scope of the claims.

What I claim as the invention is:

1. Condition responsive control apparatus for fluid fuel burners, comprising: A thermoelectric generator adapted when heated by burning of the fuel to afford a source of electric energy; an electromagnetically operated safety shut-off device; a normally deenergized electromagnetic device having a movably mounted indicating member movable upon thermoelectric energization of said device from a normal operating position to an indicating position; and a condition responsive single-pole-double-throw circuit controlling device having a first, a second, and a third contact respectively connected in circuit with said thermoelectric generator, said safety shut-off device, and said electromagnetic device, said first contact being normally in circuit-making relationship with said second contact and in circuit interrupting relationship with said third contact, thereby normally energizing the safety shut-off device to hold the latter open, said circuit controlling device being responsive to a pre-determined change in the condition to interrupt the circuit between said first and second contacts and thereby deenergize and close the safety shut-off device, said circuit controlling device also completing the circuit between said first and third contacts in response to said condition change to thereby energize said electromagnetic device and move the movable member thereof from said normal operating position to said indicating position.

2. A condition responsive control apparatus for fluid fuel burners, comprising: A thermoelectric generator adapted when heated by burning of the fuel to afford a source of electric energy; a manually resettable electromagnetically operated safety shut-off valve; a normally deenergized manually resettable electromagnetic device having a movably mounted indicating member movable upon thermoelectric energization of said device from a normal operating position to an indicating position; and a condition responsive single-pole-double-throw circuit controlling device having a first, a second, and a third contact encapsulated within a hermetically sealed enclosure and respectively connected in circuit with said thermoelectric generator, said safety shut-off valve, and said electromagnetic device, said first contact being normally in circuit-making relationship with said second contact and in circuit-interrupting relationship with said third contact, thereby normally energizing the safety shut-off valve to hold the latter open, said circuit controlling device being responsive to a predetermined change in the condition to interrupt the circuit between said first and second contacts and thereby deenergize and close the safety shut-off valve, said circuit controlling device also completing the circuit between said first and third contacts in response to said condition change to thereby energize said electromagnetic device and move the movable member thereof from said normal operating position to said indicating position.

3. Condition responsive control apparatus for fluid fuel burners, comprising: A thermoelectric generator adapted when heated by burning of the fuel to afford a source of electric energy; a manually resettable electromagnetically operated safety shut-off valve having reset means; a normally deenergized manually resettable electromagnetic device having a movably mounted indicating and reset member movable upon thermoelectric energization of said device from a normal operating position to a drop-out indicating position, said member being operable to reset said electromagnetic device on manual actuation of said member from said drop-out indicating position to said normal position, and a condition responsive circuit controlling device having a first, a second, and a third contact encapsulated within a hermetically sealed enclosure and respectively connected in circuit with said thermoelectric generator, said safety shut-off valve, and said electromagnetic device, said first contact being normally in circuit-making relationship with said second contact and in circuit-interrupting relationship with said third contact, thereby normally energizing the safety shut-off valve to hold the latter open, said circuit controlling device being responsive to a predetermined change in the condition to interrupt the circuit between said first and second contacts and thereby deenergize and close the safety shut-off valve, said circuit controlling device also completing the circuit between said first and third contacts in response to said condition change to thereby energize said electromagnetic device and move the indicating and reset member thereof from said normal operating position to said drop-out indicating position.

4. Condition responsive control apparatus for fluid fuel burners, comprising: A thermoelectric generator adapted when heated by burning of the fuel to afford a source of electric energy; a manually resettable electromagnetically operated safety shut-off valve; a permanent magnet; an armature mounted for movement between an attracted position adjacent said magnet and a drop-out position remote from said magnet, said armature being biased toward said drop-out position and being held in said attracted position by the attractive force of the magnet when moved to said attracted position; a depolarizing coil for said magnet operable in response to the flow of thermoelectric current therethrough in one direction to cause depolarization of the magnet and permit drop-out of said armature; and a condition responsive circuit controlling device having a first, a second, and a third contact encapsulated within a hermetically sealed enclosure and respectively connected in circuit with said thermoelectric generator, said safety shut-off valve, and said magnet coil, said first contact being normally in circuit-making relationship with said second contact and in circuit-interrupting relationship with said third contact, thereby normally energizing the safety shut-off valve to hold the latter open, said circuit controlling device being responsive to a predetermined change in the condition to interrupt the circuit between said first and second contacts and thereby deenergize and close the safety shut-off valve, said circuit controlling device also completing the circuit between said first and third contacts in response to said condition change to thereby energize said magnet coil and depolarize said magnet to permit drop-out of said armature, and a movably mounted indicating and reset member connected to said armature and movable therewith between a normal position and a drop-out indicating position, said member being resettable for movement of the armature to said attracted position.

5. Condition responsive control apparatus for fluid fuel burners, comprising: A thermoelectric generator adapted when heated by burning of the fuel to afford a source of electric energy; a manually resettable electromagnetically operated safety shut-off valve ; a permanent magnet; an armature mounted for movement between an attracted position adjacent said magnet and a drop-out position remote from said magnet, said armature being biased toward said drop-out position and being held in said attracted position by the attractive force of the magnet when moved to said attracted position; a depolarizing coil for said magnet operable in response to the flow of thermoelectric current therethrough in one direction to cause depolarization of the magnet and permit drop-out of said armature; a condition responsive circuit controlling device having a first, a second, and a third contact encapsulated within a hermetically sealed enclosure and respectively connected in circuit with said thermoelectric generator, said safety shut-off valve, and said magnet coil, said first contact being normally in circuit-making relationship with said second contact and in circuit-interrupting relationship with said third contact, thereby normally energizing the safety shut-off valve to hold the latter open, said circuit controlling device being responsive to a predetermined change in the condition to interrupt the circuit between said first and second contacts and thereby deenergize and close the safety shut-off valve, said circuit controlling device also completing the circuit between said first and third contacts in response to said condition change to thereby energize said magnet coil and depolarize said magnet to permit drop-out of the armature; and a movably mounted indicating member connected to said armature and movable therewith between a normal position and a drop-out-indicating position.

6. Condition responsive control apparatus for fluid fuel burners, comprising: A thermoelectric generator adapted when heated by burning of the fuel to afford a source of electric energy; electromagnetically operated safety shut-off valve having manual reset means; a permanent magnet; an armature mounted for movement between an attracted position adjacent said magnet and a drop-out position remote from said magnet, said armature being biased toward said drop-out position and being held in said attracted position by the attractive force of the magnet when moved to said attracted position; a depolarizing coil for said magnet operable in response to the flow of thermoelectric current therethrough in one direction to cause depolarization of the magnet and permit drop-out of said armature; a condition responsive circuit controlling device having a first, a second, and a third contact encapsulated within a hermetically sealed enclosure and respectively connected in circuit with said thermoelectric generator, said safety shut-off valve, and said magnet coil, said first contact being normally in circuit-making relationship with said second contact and in circuit-interrupting relationship with said third contact, thereby normally energizing the safety shut-off valve to hold the latter open, said circuit controlling device being responsive to a predetermined change in the condition to interrupt the circuit between said first and second contacts and thereby deenergize and close the safety shut-off valve, said circuit controlling device also completing the circuit between said first and third contacts in response to said condition change to thereby energize said magnet coil and depolarize said magnet to permit drop-out of the armature; a manually engageable indicating member connected to said armature and movable therewith between a normal position and a drop-out-indicating position, and an interlock between said member and said reset means of said shut-off valve such that said member when in drop-out-indicating position is disposed adjacent said safety shut-off valve reset means in a manner to prevent manual actuation of the latter.

7. A circuit controlling device, comprising: A first hermetically sealed condition responsive expansible and contractible enclosure having a fixed end wall and having a movable end wall provided with a portion forming an electrical contact member; a contact fixed within said enclosure; adjustable means biasing said movable end wall toward said fixed contact; a second contact fixed externally of said condition responsive enclosure and coacting with said movable wall portion; and a second enclosure forming a hermetically sealed chamber with said movable wall and enclosing said second contact, said movable wall portion being biased toward circuit-making relationship with said first-mentioned fixed contact and circuit-interrupting relationship with the second fixed contact, and said condition responsive enclosure being responsive to a predetermined change in the condition to move said movable wall portion against said bias to circuit-interrupting position relative to said one fixed contact and circuit-making position relative to said other fixed contact.

8. A circuit controlling device, comprising: A first hermetically sealed expansible and contractible enclosure having a fixed end wall and having a movable end wall provided with a portion forming an electrical contact member; a contact fixed within said enclosure and coacting with said movable wall portion; adjustable means biasing said movable end wall toward said fixed contact; a second contact fixed externally of said first enclosure and coacting with said movable wall portion; a second enclosure forming a hermetically sealed chamber with said movable wall and enclosing said second contact, said movable wall portion being biased toward circuit-making relationship with said first-mentioned fixed contact and circuit-interrupting relationship with the second fixed contact; a stable gaseous fill in said second enclosure; and a temperature responsive expansible and contractible volatile fluid fill in said first enclosure, said latter fill being responsive to a predetermined temperature to move said movable wall portion against said bias to circuit-interrupting position relative to said first-mentioned fixed contact and circuit-making position relative to said second fixed contact.

9. A circuit controlling device, comprising: A hermetically sealed bellows having a fixed end wall and having an opposite end wall; a movable transverse intermediate wall separating said bellows into first and second sealed chambers, said intermediate wall having a portion forming an electrical contact member; a first contact within said first chamber carried by said fixed end wall; a second contact within said second chamber carried by said opposite end wall; adjustable positioning means in engagement with said opposite end wall and defining the position of the latter and of said second contact; adjustable biasing means biasing said transverse intermediate wall toward circuit-making relationship with said first contact and circuit-interrupting relationship with said second contact; and a condition responsive expansible and contractible volatile fluid fill in said first chamber responsive to a predetermined change in the condition to move said intermediate wall portion against said bias to circuit-interrupting position relative to said first contact and circuit-making position relative to said second contact.

10. A circuit controlling device, comprising: A hermetically sealed bellows having a fixed end wall and having an opposite end wall; a movable transverse intermediate wall separating said bellows into first and second sealed chambers, said intermediate wall having a portion forming an electrical contact member and having a portion projecting externally of said bellows; a first contact within said first chamber carried by said fixed end wall; a second contact within said second chamber carried by said opposite end wall; adjustable positioning means in engagement with said opposite end wall and defining the position of the latter and of said second contact; a coiled spring surrounding said bellows and engaging said externally projecting portion of said intermediate wall, said spring biasing said transverse intermediate wall toward circuit-making relationship with said first contact and circuit-interrupting relationship with said second contact; a condition responsive expansible and contractible volatile fluid fill in said first chamber responsive to a predetermined change in the condition to move said intermediate wall portion against said bias to circuit-interrupting position relative to said first contact and circuit-making position relative to said second contact.

11. A circuit controlling device, comprising: A hermetically sealed bellows having a fixed end wall and having an opposite end wall; a movable transverse intermediate wall separating said bellows into first and second sealed chambers, said intermediate wall having a portion forming an electrical contact member and having a portion projecting externally of said bellows; a first contact within said first chamber carried by said fixed end wall; a second contact within said second chamber carried by said opposite end wall; adjustable positioning means in engagement with said opposite end wall and defining the position of the latter and of said second contact; a coiled spring surrounding said bellows and engaging said externally projecting portion of said intermediate wall, said spring biasing said transverse intermediate wall toward circuit-making relationship with said first contact and circuit-interrupting relationship with said second contact; a condition responsive expansible and contractible volatile fluid fill in said first chamber responsive to a predetermined change in the condition to move said intermediate wall portion against said bias to circuit-interrupting position relative to said first contact and circuit-making posiiton relative to said second contact; and adjustable abutment means operatively associated with said positioning means and engaging said coil spring, adjustment of said abutment means affording variation in the bias of said spring on said intermediate wall and thereby adjustment of the control point of the device.

12. Condition responsive control apparatus comprising, a thermoelectric generator adapted when heated by burning fuel to afford a source of electric energy, a resettable control device, an electromagnetic device having an operating member movable from a first position to a second position by thermoelectric energization of said device, and a condition responsive single-pole-double-throw circuit-controlling device having contacts in circuit with said thermoelectric generator, said resettable control device, and said electromagnetic device, said circuit-controlling device being operable in response to one condition to complete the circuit between said generator and said resettable control device for thermoelectric energization of the latter, and said circuit-controlling device also being operable in response to another condition to interrupt the circuit between said generator and said resettable control device and to complete the circuit between said generator and said electromagnetic device to thereby effect deenergization of said resettable control device and thermoelectric energization of said electromagnetic device and thereby actuation of said operating member to said second position, said operating member when in its said second position preventing resetting of said resettable control device.

13. Condition responsive control apparatus comprising, a thermoelectric generator adapted when heated by burning fuel to afford a source of electric energy, a resettable control device, an electromagnetic device having an operating member movable from a first position to a second position by thermoelectric energization of said device, and a condition responsive single-pole-double-throw circuit-controlling device having contacts encapsulated within an hermetically sealed enclosure and connected in circuit with said thermoelectric generator, said resettable control device, and said electromagnetic device, said circuit-controlling device being operable in response to one condition to complete the circuit between said generator and said resettable control device for thermoelectric energization of the latter, and said circuit-controlling device also being operable in response to another condition to interrupt the circuit between said generator and said resettable control device and to complete the circuit between said generator and said electromagnetic device to thereby effect deenergization of said resettable control device and thermoelectric energization of said electromagnetic device and thereby actuation of said operating member to said second position, said operating member when in its said second position preventing resetting of said resettable control device.

14. Condition responsive control apparatus comprising, a thermoelectric generator adapted when heated by burning fuel to afford a source of electric energy, a resettable control device, an electromagnetic device having indicating means actuable upon thermoelectric energization of said device, and a condition responsive single-pole-double-throw circuit-controlling device having contacts in circuit with said thermoelectric generator, said resettable control device, and said electromagnetic device, said circuit-controlling device being operable in response to one condition to complete the circuit between said generator and said resettable control device for thermoelectric energization of the latter, and said circuit-controlling device also being operable in response to another condition to interrupt the circuit between said generator and said resettable control device and to complete the circuit between said generator and said electromagnetic device to thereby effect deenergization of said resettable control device and thermoelectric energization of said electromagnetic device and thereby actuation of said indicating means.

15. Condition responsive control apparatus comprising, in combination, an electrical circuit including a source of power, means including a cycling control device in said circuit operable to afford an increase in the value of a given condition of a given medium, first condition responsive circuit controlling means in said circuit for controlling the operation of said cycling control device, said circuit controlling means being calibrated for response to normal fluctuations in said given condition to cycle said cycling control device in response to said normal fluctuations, a resettable control device in said circuit operable to render said cycling control device incapable of increasing said given condition, an electromagnetic device in said circuit having an operating member movable from a first position to a second position by energization of said electromagnetic device by said source of power, and second condition responsive circuit controlling means of the single-pole-double-throw type in said circuit for controlling operation of said resettable control device and said electromagnetic device independently of the control over said cycling control device afforded by said first circuit controlling means, said second circuit controlling means being calibrated for response to a normal value of said given condition to effect energization of said resettable control device by said source of power to permit operation of said cycling control device, and being calibrated for response to an extreme value of said given condition to effect deenergization of said resettable control device and energization of said electromagnetic device and thereby actuation of said operating member to said second position, whereby said cycling control device normally maintains said given condition of said medium within certain limits, said resettable control device being operable upon occurrence of an extreme of such condition to render said cycling control device inoperable whereupon the operating member of said electromagnetic device is moved from its first to its second position, said operating member when in its said second position preventing resetting of said resettable control device.

16. Condition responsive control apparatus comprising, in combination, an electrical circuit including a thermoelectric generator affording a source of electric energy, means including a cycling control device is said circuit operable to afford an increase in the value of a given condition of a given medium, first condition responsive circuit controlling means in said electrical circuit having contacts encapsulated within an hermetically sealed enclosure for controlling the operation of said cycling control device, said circuit controlling means being calibrated for response to normal fluctuations in said given condition to cycle said cycling control device in response to said normal fluctuations, a resettable control device in said circuit energizable by said thermoelectric generator to render said cycling control device incapable of increasing said given condition, an electromagnetic device in said circuit having an operating member movable from a first position to a second position by energization of said electromagnetic device by said thermoelectric generator, and second condition responsive circuit controlling means of the single-pole-double-throw type having contacts in said electrical circuit and encapsulated within an hermetically sealed enclosure for controlling operation of said resettable control device and said electromagnetic device independently of the control over said cycling control device afforded by said first circuit controlling means, said second circuit controlling means being calibrated for response to a normal value of said given condition to effect energization of said resettable control device by said thermoelectric generator to permit said cycling control device to increase said given condition, and being calibrated for response to an extreme value of said given condition to effect deenergization of said resettable control device and energization of said electromagnetic device and thereby actuation of said operating member to its second position, whereby said cycling control device normally maintains said given condition of said medium within certain limits, said resettable control device being operable upon occurrence of an extreme of such condition to render said cycling control device incapable of increasing said condition whereupon the operating member of said electromagnetic device is moved from its first to its second position, said operating member when in its said second position preventing resetting of said resettable control device.

17. Condition responsive control apparatus comprising, in combination, an electrical circuit including a source of power, means including a cycling control device in said circuit operable to afford an increase in the value of a given condition of a given medium, first condition responsive circuit controlling means in said circuit for controlling the operation of said cycling control device, said circuit controlling means being calibrated for response to normal fluctuations in said given condition to cycle said cycling control device in response to said normal fluctuations, a resettable control device in said circuit energizable by said source of power to render said cycling control device incapable of increasing said given condition, an electromagnetic device in said circuit having indicating means actuable by energization of said electromagnetic device by said source of power, and second condition responsive circuit controlling means of the single-pole-double-throw type in said circuit for controlling the operation of said resettable control device and said electromagnetic device independently of the control over said cycling control device afforded by said first circuit controlling means, said second circuit controlling means being calibrated for response to a normal value of said given condition to effect energization of said resettable control device by said source of power to permit said cycling control device to increase said given condition, and being calibrated for response to an extreme value of said given condition to effect deenergization of said resettable control device and energization of said electromagnetic device and thereby actuation of said indicating means, whereby said cycling control device maintains said given condition of said medium within certain limits, said resettable control device being operable upon occurrence of an extreme of such condition to render said cycling control device incapable of increasing said condition whereupon the indicating means of said electromagnetic device is caused to be actuated.

References Cited in the file of this patent
UNITED STATES PATENTS

| | | |
|---|---|---|
| 1,205,434 | Connell | Nov. 21, 1916 |
| 2,290,048 | Hildebrecht | July 14, 1942 |
| 2,290,049 | Hildebrecht | July 14, 1942 |
| 2,312,479 | Ray | Mar. 2, 1943 |
| 2,421,149 | Hard af Segerstad | May 27, 1947 |